United States Patent
Kudana et al.

(10) Patent No.: US 8,345,996 B2
(45) Date of Patent: Jan. 1, 2013

(54) DETERMINATION OF A FIELD REFERENCING PATTERN

(75) Inventors: Arun Shankar Kudana, Bangalore (IN); Soyeb Nagori, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 850 days.

(21) Appl. No.: 12/465,673

(22) Filed: May 14, 2009

(65) Prior Publication Data
US 2010/0002944 A1    Jan. 7, 2010

(51) Int. Cl.
*G06K 9/36* (2006.01)
*H04N 7/26* (2006.01)
*G06K 9/46* (2006.01)

(52) U.S. Cl. .................... 382/236; 375/240.16

(58) Field of Classification Search .......... 382/232, 382/233, 236, 238; 375/240.12, 240.16, 375/240.17, 240.25; 348/390, 402, 416, 348/443, 447, 449, 699, 716; 345/531, 547
See application file for complete search history.

(56) References Cited

U.S. PATENT DOCUMENTS

| | | | | |
|---|---|---|---|---|
| 6,011,870 A | * | 1/2000 | Jeng et al. | 382/236 |
| 6,088,047 A | * | 7/2000 | Bose et al. | 345/547 |
| 6,295,089 B1 | * | 9/2001 | Hoang | 348/390.1 |
| 6,389,076 B2 | * | 5/2002 | Bakhmutsky et al. | 375/240.17 |
| 6,539,058 B1 | * | 3/2003 | Pearlstein et al. | 375/240.25 |
| 6,968,008 B1 | * | 11/2005 | Ribas-Corbera et al. | 375/240.16 |
| 7,336,720 B2 | * | 2/2008 | Martemyanov et al. | 375/240.12 |
| 8,081,682 B1 | * | 12/2011 | Carbacea et al. | 375/240.24 |
| 2003/0108105 A1 | * | 6/2003 | Morad et al. | 375/240.26 |
| 2010/0002944 A1 | * | 1/2010 | Kudana et al. | 382/236 |

OTHER PUBLICATIONS

Nagori S, Kudana A & Rao, A, "Video Encoding Algorithm for B-frames in 1080p IVA-HD"—TI Internal Technical report, Nov. 2007.
Frame and picture management Draft 1.0 © Iain G Richardson.
Bjontegaard G, "Calculation of average PSNR difference between RD-curves", VCEG-M33, Mar. 2001.

* cited by examiner

*Primary Examiner* — Amir Alavi
(74) *Attorney, Agent, or Firm* — Mirna Abyad; W. James Brady; Frederick J. Telecky, Jr.

(57) ABSTRACT

Several methods and a system to perform determination of a field referencing pattern are disclosed. In one aspect, a method is disclosed. A motion vector of a previously coded frame is analyzed using a processor and a memory. A statistic is updated based on whether the motion vector includes one or more of a fractional pel vertical component, a half pel vertical component, and an integer pel vertical component. A field referencing pattern of a target field is determined based on the statistic and an exception protocol.

13 Claims, 18 Drawing Sheets

DETERMINATION OF A FIELD REFERENCING PATTERN

FIELD OF TECHNOLOGY

This disclosure relates generally to determination of a field referencing pattern in interlaced video encoding.

BACKGROUND

A video encoder may select a reference field to be used in encoding a frame of interlaced content. The method may use the same parity field of a previously coded frame as a reference field during motion estimation or motion compensation. The method may result in video compression below a desired quality when motion in the video signal is such that multiple motion vectors between the reference field and the current field includes a substantial number of fractional pixel units. Encoding the frame of interlaced content with video compression below the desired quality may result in an increased bit rate of interlaced content. The increased bit rate may result in an additional time of transmission, an added memory, and an inefficiency of encoding or decoding the interlaced content.

SUMMARY

This Summary is provided to comply with 37 C.F.R. §1.73, requesting a summary of the invention briefly indicating the nature and substance of the invention. It is submitted with the understanding that it will not be used to limit the scope or meaning of the claims.

Several methods and a system to perform determination of a field referencing pattern are disclosed.

In an exemplary embodiment a method is disclosed. A motion vector of a previously coded frame is analyzed using a processor and a memory. A statistic is updated based on whether the motion vectors include one or more of a fractional pel vertical component, a half pel vertical component, and an integer pel vertical component. A field referencing pattern of a target field is determined based on one or both of the statistics and an exception protocol.

In an exemplary embodiment, a system is disclosed. The system includes an aggregation module to analyze a motion vector of a previously coded frame using a processor and a memory. Further, the system includes an evaluation module to update a statistic based on whether the motion vector includes one or more of a fractional pel vertical component, a half pel vertical component, and an integer pel vertical component. In addition, the system includes a selection module to determine a field referencing pattern of a target field based on one or both of the statistic and an exception protocol.

In an exemplary embodiment a method is disclosed. A motion vector of a previously coded frame is analyzed using a processor and a memory. A statistic is updated based on a quantity of motion vectors that includes one or more of a fractional pel vertical component, a half pel vertical component, and an integer pel vertical component. The statistic includes one or both of a half pel ratio and a fractional pel ratio. The half pel ratio is proportional to a number of half pel macroblocks divided by a total number of macroblocks of the previously coded frame. The fractional pel ratio is proportional to a number of fractional pel macroblocks divided by a total number of macroblocks of the previously coded frame.

A texture level is determined using a group of pixels of the currently coded frame. A half pel ratio threshold is adapted to an alternate half pel ratio threshold and a fractional pel ratio threshold is adapted to an alternate fractional pel ratio threshold when the texture level is greater than a texture limit. A field referencing pattern of a target field is determined based on one or both of the statistic and an exception protocol. The field referencing pattern identifies a reference field including one or more of a same parity field and a most recently coded reference field. The target field is encoded using the field referencing pattern identified.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying Drawings and from the Detailed Description that follows.

BRIEF DESCRIPTION OF THE VIEWS OF DRAWINGS

Example embodiments are illustrated by way of example and not limitation in the figures of the accompanying drawings, in which like references indicate similar elements and in which.

Other features of the present embodiments will be apparent from the accompanying Drawings and from the Detailed Description that follows.

DETAILED DESCRIPTION

Several methods and a system to perform determination of a field referencing pattern are disclosed. Although the embodiments have been described with reference to specific example embodiments, it will be evident that various modifications and changes may be made to these embodiments without departing from the broader spirit and scope of the various embodiments.

Figure 1:
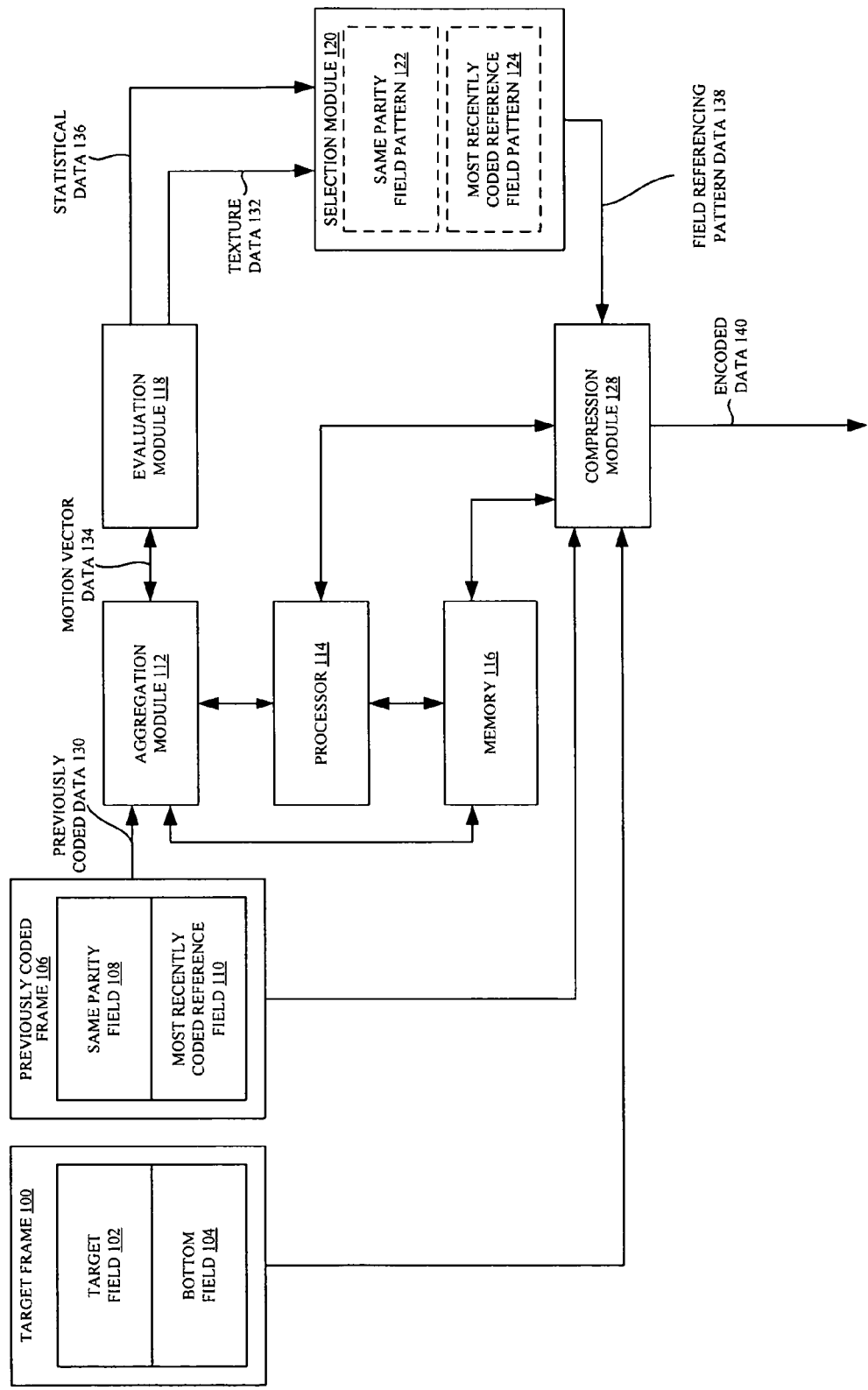
FIG. 1 is schematic view illustrating a system to determine a field referencing pattern of a target field, according to one embodiment.

FIG. 1 is schematic view illustrating a system to determine a field referencing pattern of a target field, according to one embodiment. In particular, FIG. 1 illustrates a target frame 100, a target field 102, a bottom field 104, a previously coded frame 106, a same parity field 108, a most recently coded reference field 110, an aggregation module 112, a processor 114, a memory 116, an evaluation module 118, a selection module 120, a same parity field pattern 122, a most recently coded reference field pattern 124, a compression module 128, a previously coded data 130, a texture data 132, a motion vector data 134, a statistical data 136, a field referencing pattern data 138, and an encoded data 140, according to one embodiment.

In an example embodiment, the target frame 100 may include the target field 102 and the bottom field 104. The previously coded frame 106 may include the same parity field 108 and the most recently coded reference field 110. The aggregation module may be communicatively coupled to the processor 114, the memory 116, and the evaluation module 118. The evaluation module may be communicatively coupled to the selection module 120. The selection module may include the same parity field pattern 122 and the most recently coded reference field pattern 124. The processor 114, the memory 116 and the target frame 100 may be communicatively coupled to the compression module 128. The processor 114 may be communicatively coupled to the memory 116. The selection module 120 may communicate with the compression module 128.

In an embodiment, the aggregation module 112 analyzes multiple motion vectors of a previously coded frame 106 using the processor 114 and the memory 116. The analysis may generate a motion vector data 134. The analysis may include evaluating the vertical component of a motion vector. The analysis may determine whether a vertical component of the motion vector is a fractional pel, half pel, or integer pel vertical component. The aggregation module 112 may count the number of motion vectors that fall within different categories such as fractional pel, half pel, or integer pel categories. The analysis may include an examination or categorization of macroblocks, individual pixels, and groups of pixels of any size.

The aggregation module 112 may communicate the motion vector data 134 to the evaluation module 118. The operation of the aggregation module 112 may also be better understood from the description of FIG. 2.

According to an embodiment, the evaluation module 118 updates the statistic based on whether a motion vector includes a fractional pel vertical component, a half pel vertical component, and an integer pel vertical component. The statistic may be determined using a quantity of one or more of the fractional pel vertical component, half pel vertical component, and the integer pel vertical component. The statistic may be a sum, a ratio, or a result of a calculation based on the motion vector data 134. The statistic may include a proportion of the number of motion vectors that constituted integer pel, half pel, and fractional pel motion vectors out of the total number of motion vectors.

The evaluation module may include the statistic in the statistical data 136. The motion vector data 134 may include information with respect to the number of macro-blocks or motion capture blocks with motion vectors. The motion vector data 134 may relate to individual pixels or a group of pixels of any size. A pel may be equivalent to a pixel, which may be the smallest addressable unit on a display screen. A pel may include smaller sub pixels, which may represent red, green, and blue colors.

In an embodiment, the evaluation module 118 determines a texture level using a group of pixels of the currently coded frame. The evaluation module 118 may communicate a statistical data 136 and a texture data 132 to the selection module 120.

In an embodiment, the selection module 120 determines a field referencing pattern of a target field 102 based on any one of the statistic and an exception protocol. The statistic may be a sum, an average, a ratio, or a variable based on input data. The statistic may be the result of a calculation based on the motion vector data. The exception protocol may be an override procedure that determines which field referencing pattern is chosen based on one or more factors other than the statistic.

The exception protocol may determine that the field referencing pattern is a most recently coded reference field when the target field is a bottom field of an intra coded frame. The exception protocol may determine that the field referencing pattern is a most recently coded reference field when the target field is a bottom field of a P-frame in a sequence that includes one or more B frames. A P-frame may be a predicted picture that includes a change in an image from a previous frame. B-frame may be a bi-predictive frame that uses one or more of a previous and a forward frame as data references, and it may include a change in the image from one or more of its data references.

In an embodiment, the selection module 120 changes the field referencing pattern when one or both of the half pel ratio threshold and the fractional pel ratio threshold is exceeded. The field referencing pattern may be kept the same when the half pel ratio is lower than a half pel ratio threshold $\alpha$ and the fractional pel ratio is lower than a fractional pel ratio threshold $\beta$. The half pel ratio threshold $\alpha$ may be within a tolerance range of 0.5. The fractional pel ratio threshold $\beta$ may be within a tolerance range of 0.9. The particular values used for the half pel and fractional pel ratio thresholds, along with the tolerance levels, may vary depending on the data evaluated, the software or hardware used in the system, and purposes of determining the ratios. In another embodiment, the change between field referencing patterns may include hysteresis thresholds to prevent increased shifts between field referencing patterns based on small changes in fractional and half pel ratios that may be close to the thresholds $\alpha$ or $\beta$. In a further embodiment, the thresholds $\alpha$ or $\beta$ may be determined dynamically based on the motion vector data 134, the statistical data 136, the texture data 132, or other factors.

In an embodiment, the selection module 120 adapts one or both of a half pel ratio threshold and a fractional pel ratio threshold to an alternate threshold when the texture level is greater than a texture limit. The texture level $\theta$ may be the average activity of all the macro-blocks of the previously coded frame. The texture level $\theta$ of a macroblock may be equivalent to the activity level of the macroblock, which may be determined by summing the absolute values of the differences between adjacent luminance pixel values of the macroblock in both vertical and horizontal directions. In an embodiment, the texture limit may be 4000.

The alternate threshold may include one or both of an alternate half pel ratio threshold and a fractional pel ratio threshold. The alternate half pel ratio threshold may be within a threshold tolerance of 0.3 and the alternate fractional pel ratio threshold may be within a threshold tolerance of 0.7. In another embodiment, the half pel ratio threshold or the fractional pel ratio threshold may be reduced when IPP encoding is used.

The field referencing pattern may be one or more of a same parity field, a most recently coded reference field, or any pattern of selecting a reference field to use with motion estimation or encoding. For example the field referencing pattern may be the same parity field pattern 122 or the most recently coded reference field pattern 124. The same parity field pattern 122 may use a top field of a reference frame when the target field is a top field. The same parity field pattern 122 may use a bottom field of a reference frame when the target field 102 is a bottom field. The most recently coded reference field pattern 124 may select a reference field that was more recently coded than the same parity field 108. The most recently coded reference field may be from a prior or later frame than the target field, or it may be from the same frame as the target field 102.

The compression module 128 may encode the target field 102 using the field referencing pattern, the processor 114 and the memory 116. The field referencing pattern may identify a reference field. The reference field may include one or more of a same parity field and a most recently coded reference field. The compression module 128 may obtain the field referencing pattern data 138 from the selection module 120. In an embodiment, the methods and system disclosed may result in a 20% reduction in the bit-rate of interlaced video content over other methods. The interlaced video content may include interlaced H.264 video.

Figure 2:
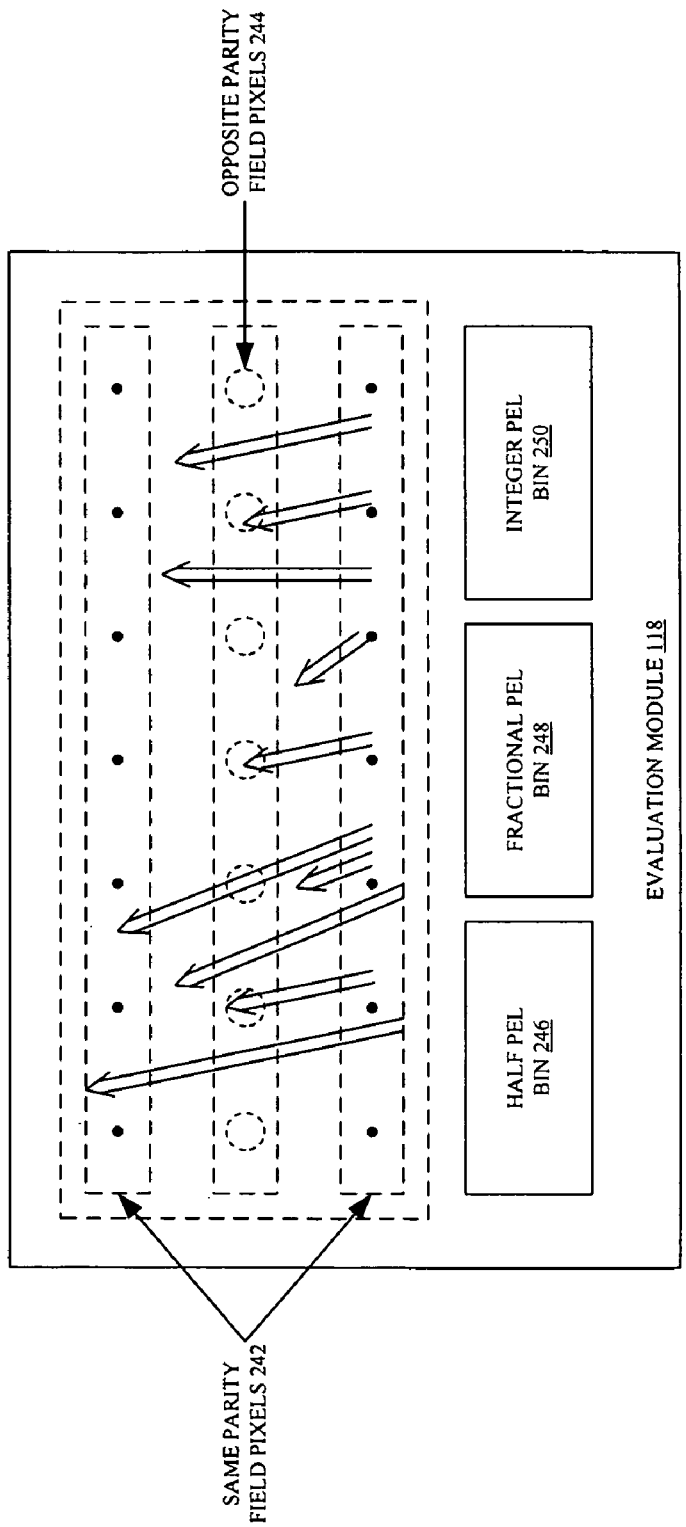
FIG. 2 is an exploded view of an evaluation module illustrating analysis of a motion vector of a previously coded frame, according to one embodiment.

FIG. 2 is an exploded view of an evaluation module illustrating analysis of a motion vector of a previously coded frame, according to one embodiment. In particular, FIG. 2 illustrates the evaluation module 118, same parity field pixels 242, opposite parity field pixels 244, a half pel bin 246, a fractional pel bin 248, and an integer pel bin 250, according to one embodiment. The evaluation module 118 may include the same parity field pixels 242, the opposite parity field pixels 244, the half pel bin 246, the fractional pel bin 248 and the integer pel bin 250.

According to one embodiment, the evaluation module updates a statistic based on one or more motion vectors. A motion vector of a previously coded frame may point at a location within a vertical tolerance range of either a row of pixels of the same parity field pixels 242. The motion vector may point at a row of pixels of a different parity field, which may be a group of opposite parity field pixels 244. The different parity field may be a most recently coded reference field. The motion vector may be designated an integer pel motion vector, and it may be sorted into an integer pel bin. The vertical tolerance range of the pixel row of the previously coded frame may be an integer pel tolerance range.

The motion vector of the previously coded frame may fall in an area between vertical tolerance ranges of the pixel rows of the same parity field, and it may be included in a fractional pel bin. The motion vector may point at a location within a vertical tolerance range of a line half way between rows of pixels of the same parity field, and the motion vector may be designated a half pel motion vector. The vertical tolerance range of the halfway line between rows of pixels of the same parity field may be a half pel tolerance range.

The half pel bin 246 may count a number of half pel motion vectors, the fractional pel bin 248 may count a number of fractional pel motion vectors, and the integer pel bin 250 may count a number of integer pel motion vectors.

Figure 3A:
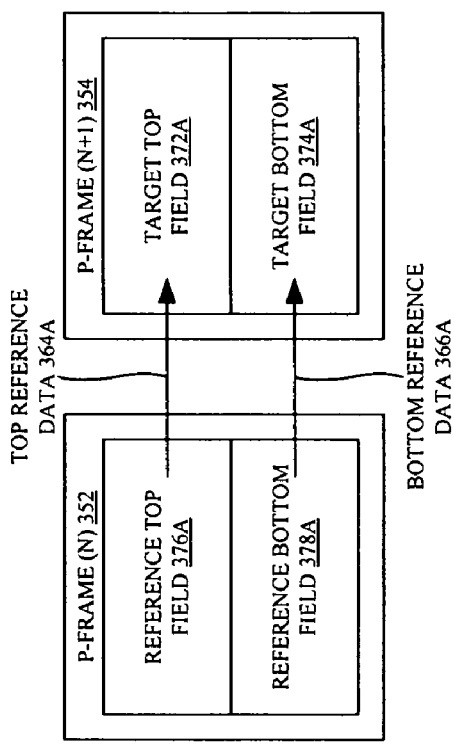
FIGS. 3A-3C are schematic views illustrating a same parity field referencing pattern, according to various embodiments.
Figure 3B:
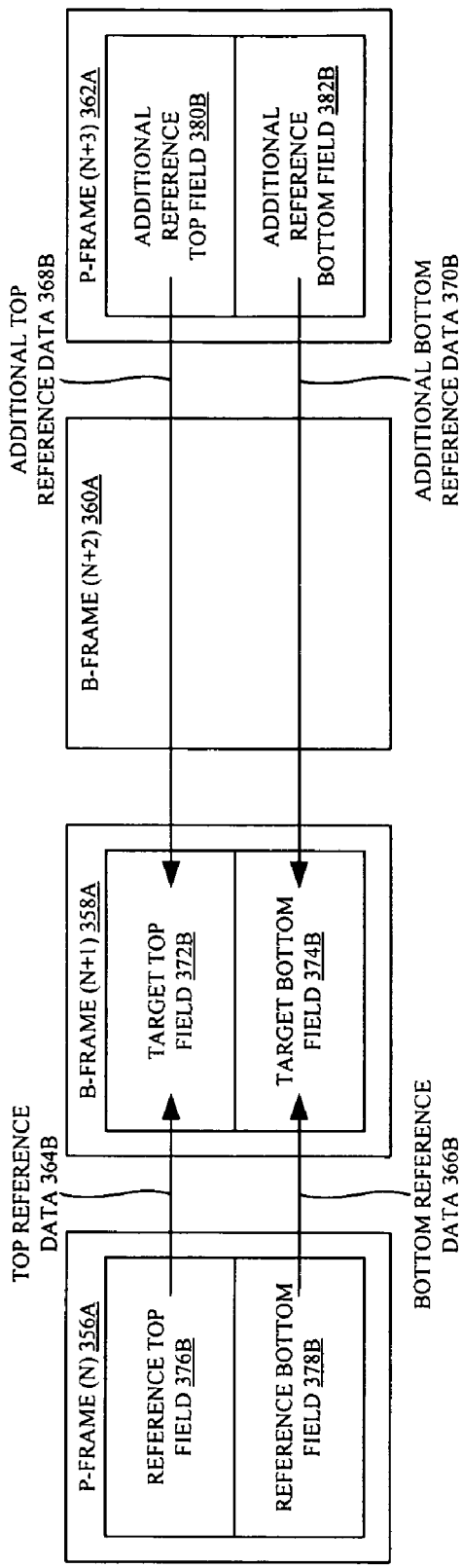
Figure 3C:
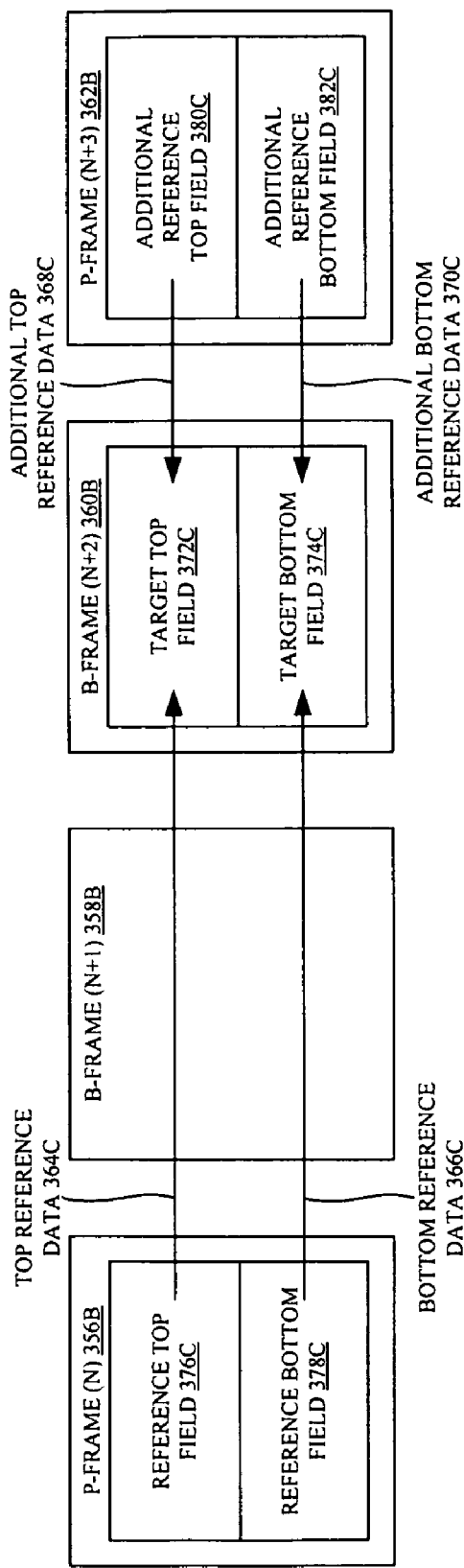

FIGS. 3A-3C are schematic views illustrating a same parity field referencing pattern, according to various embodiments. In particular, FIGS. 3A-3C illustrate a P-frame (N) 352, a P-frame (N+1) 354, a P-frame (N) 356A-B, a B-frame (N+1) 358A-B, a B-frame (N+2) 360A-B, a P-frame (N+3) 362A-B, a top reference data 364A-C, a bottom reference data 366A-C, an additional top reference data 368B-C, an additional bottom reference data 370B-C, a target top field 372A-C, a target bottom field 374C, a reference top field 376A-C, a reference bottom field 378A-C, an additional reference top field 380B-C and additional reference bottom field 382B-C, according to one embodiment.

In an example embodiment, the P-frame (N) 352 may include the reference top field 376A and the reference bottom field 378A. The P-Frame (N+1) 354 may include the target top field 372A and the target bottom field 374A. The target top field 372A may obtain the top reference data 364A from the reference top field 376A. The target bottom field 374A may obtain the bottom reference data 366A from the reference bottom field 378A.

In another example embodiment, the P-frame (N) 356B may include the reference top field 376B and the reference bottom field 378B. The B-frame (N+1) 358A may include the target top field 372B and the target bottom field 374B. The P-frame (N+3) 362A may include the additional reference top field 380B and the additional reference bottom field 382B. The target top field 372B may obtain the top reference data 364B from the reference top field 376B. The target top field 372B may obtain the additional top reference data 368B from the additional reference top field 380B. The target bottom field 374B may obtain the bottom reference data 366B from the reference bottom field 378B. The target bottom field 374B may obtain the additional bottom reference data 370B from the additional reference bottom field 382B.

In yet another example embodiment, the P-frame (N) 356B may include the reference top field 376C and the reference bottom field 378C. The B-frame (N+2) 360B may include the target top field 372 C and the target bottom field 374 C. The P-frame (N+3) 362B may include the additional reference top field 380C and the additional reference bottom field 382C. The target top field 372C may obtain the top reference data 364C from the reference top field 376C. The target top field 372C may obtain the additional top reference data 368C from the additional reference top field 380C. The target bottom field 374C may obtain the bottom reference data 366C from the reference bottom field 378C. The target bottom field 374C may obtain the additional bottom reference data 370C from the additional reference bottom field 382C. According to one embodiment, FIG. 3A may exemplify use of the same parity field reference pattern with a target field of a P-frame. FIGS. 3B-C may exemplify use of the same parity field reference pattern with a target field of a B-frame. The choice between different field reference patterns may be determined using the selection module 120. The top field may be predicted from the top field of the previously coded reference frame and the bottom field may be predicted from the bottom field of the previously coded reference frame as depicted in FIGS. 3A-C.

Figure 4A:
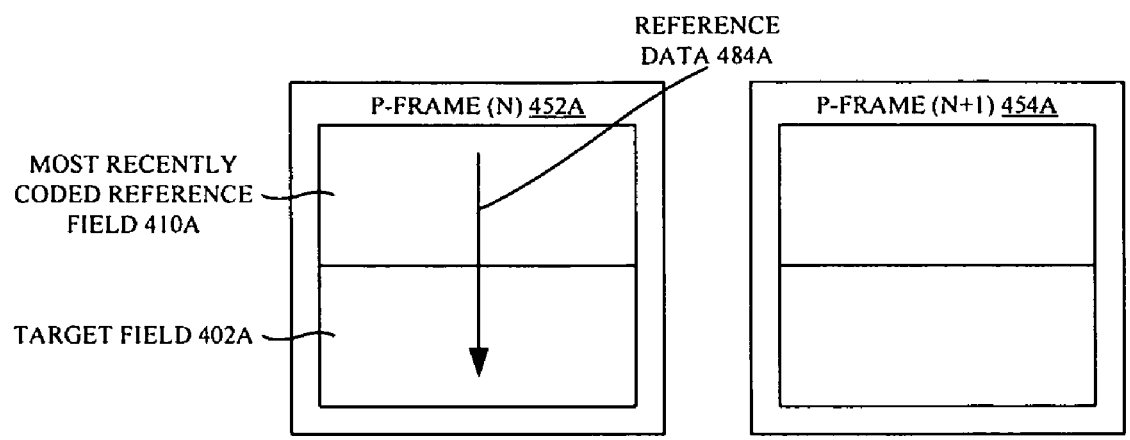
FIGS. 4A-4C are schematic views illustrating a most recently coded reference field referencing pattern of a P-frame, according to various embodiments.
Figure 4B:
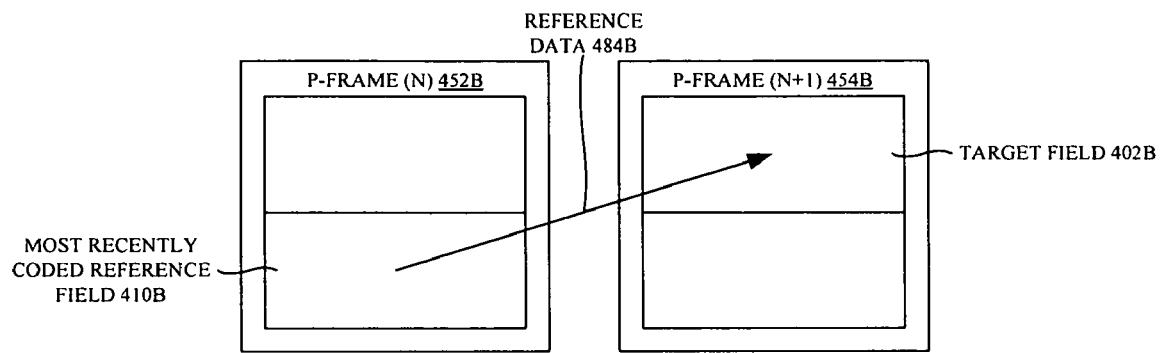
Figure 4C:
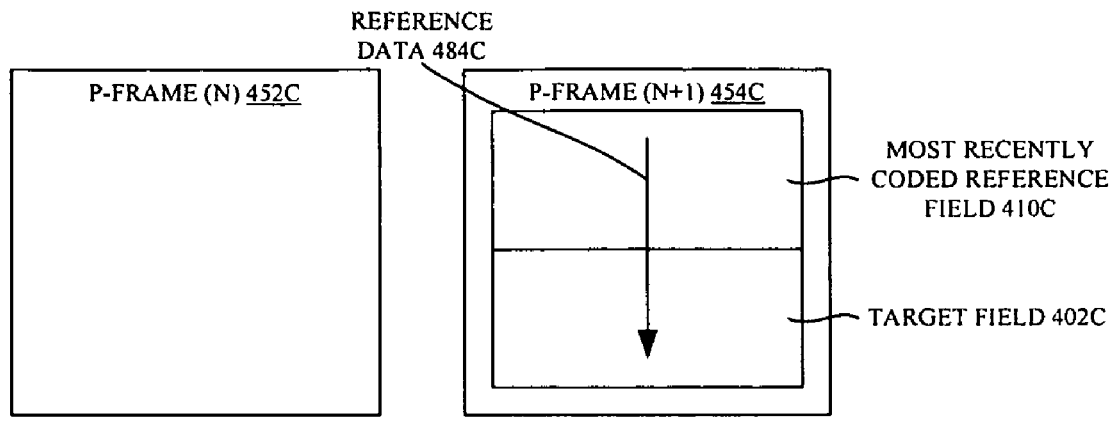

FIGS. 4A-4C are schematic views illustrating a most recently coded reference field referencing pattern of a P-frame, according to various embodiments. In particular, FIGS. 4A-4C illustrate a target field 402A-C, a most recently coded reference field 410A-C, a P-frame (N) 452A-C, a P-frame (N+1) 454A-C, a reference data 484A-C, according to various embodiments.

The P-frame 452A may include the most recently coded reference field 410A and the target field 402A. The target field 402A may obtain the reference data 484A from the most recently coded reference field 410A. Once the bottom field of the P-frame (N) 452A is encoded, it may be used as the most recently coded reference field 410B to encode the target field 402B. The target field 402B may be encoded using the reference data 484B of the most recently code reference field 410B. After the target field 402B is encoded, it may in turn be used as the most recently coded reference field 410C. The P-frame (N+1) 454C may include the most recently coded reference field 410C and the target field 402C. The target field 402C may obtain the reference data 484C from the most recently coded reference field 410C.

Figure 5A:
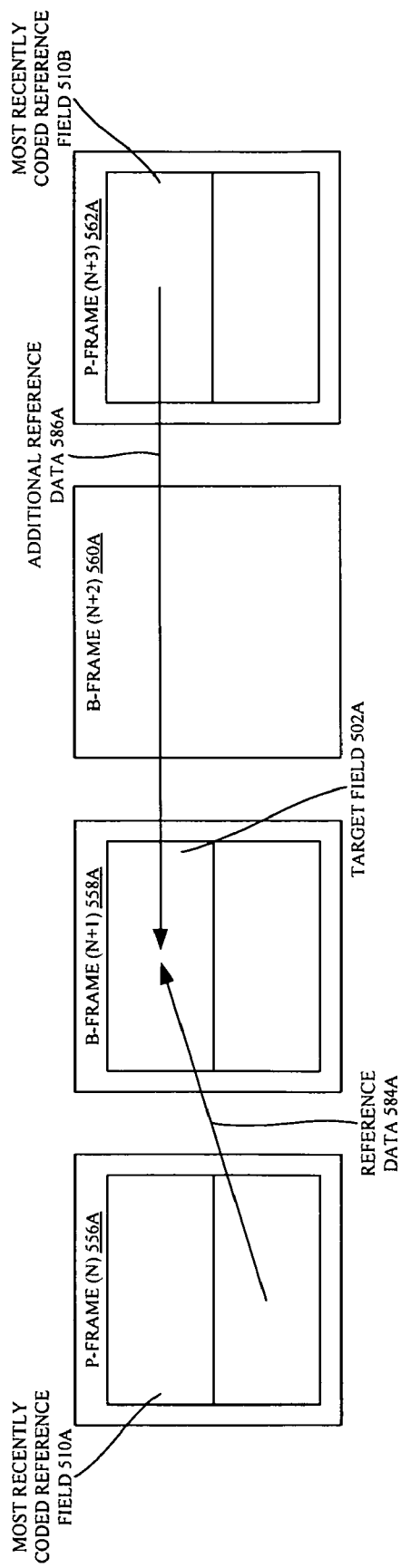
FIGS. 5A-5B are schematic views illustrating a most recently coded field referencing pattern of a B-frame, according to various embodiments.
Figure 5B:
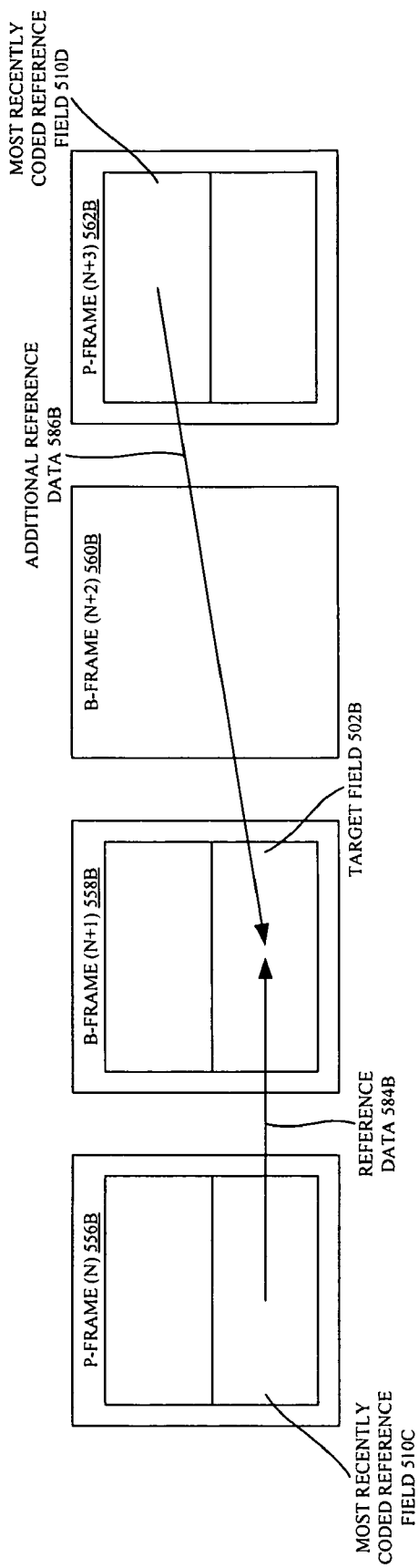

FIGS. 5A-5B are schematic views illustrating a most recently coded field referencing pattern of a B-frame, according to various embodiments. In particular, FIGS. 5A-5B illustrate a target field 502A-B, a most recently coded reference field 510A-D, a P-frame (N) 556A-B, a B-frame (N+1) 558A-B, a B-frame (N+2) 560A-B, a reference data 584A-B, and an additional reference data 586A-B, according to various embodiments.

The B-frame (N+1) 558A may include the target field 502A. The target field 502A may be encoded using one or both of the reference data 584A and the additional reference data 586A. The reference data 584A may be obtained from the most recently coded reference field 510A. The additional reference data 586A may be obtained from the most recently coded reference field 510B. In another embodiment, the target field 502B may be encoded using one or both of the reference data 584B and the additional reference data 586B. The reference data 584B may be obtained from the most recently coded reference field 510C. The additional reference data 586B may be obtained from the most recently coded reference field 510D.

Figure 6A:
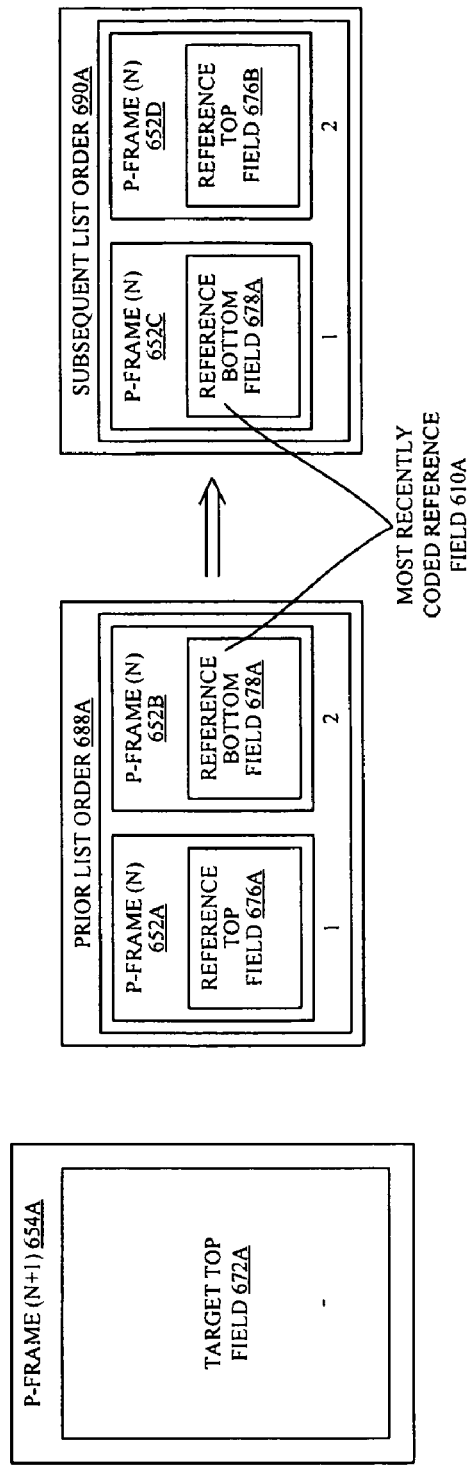
FIGS. 6A-6B are schematic views illustrating list reordering of a P frame in an IPP sequence, according to one embodiment.
Figure 6B:
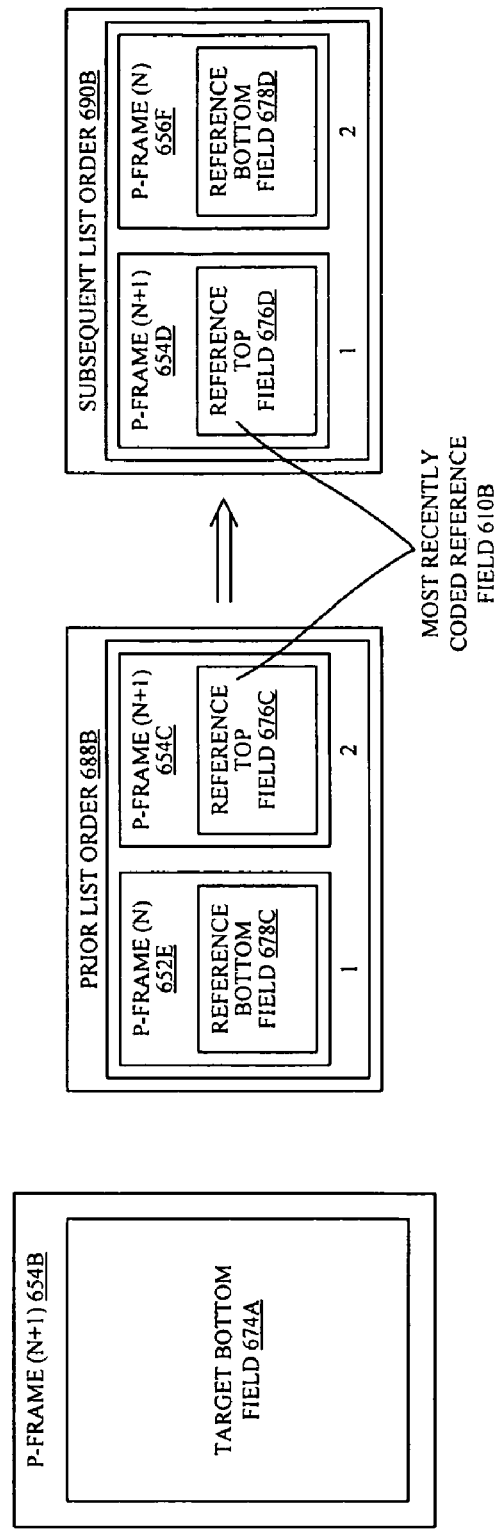

FIGS. 6A-6B are schematic views illustrating list reordering of a P frame in an IPP sequence, according to one embodiment. In particular, FIGS. 6A-6B illustrate a most recently coded reference field 610A-B, a prior list order 688A-B, a subsequent list order 690A-B, a P-frame (N) 652A-F, a P-frame (N+1) 654A-D, a reference top field 676A-D, and a reference bottom field 678A-D, according to one embodiment.

According to one embodiment, FIGS. 6A-6B may exemplify list reordering of a P-frame in IPP sequence. In a particular example embodiment, the size of the list for the given P-frame may be two.

The prior list order 688A of the top field of the P-frame (N+1) 658A may include a most recently coded reference field 610A in the second position of the list. After reordering, the subsequent list order 690A may include the most recently coded reference field 610A in the first position of the list. The prior list order 688B of the bottom field of the P-frame (N) 658B may include a most recently coded reference field 610B in the second position of the list. After reordering, the subsequent list order 690B may include the most recently coded reference field 610B in the first position of the list.

In an embodiment, a reference field list may be reordered when the field referencing pattern identifies a reference field comprised of a most recently coded reference field. A reference picture list may be constructed for different slices, which may be spatially distinct regions of a frame that are encoded separately from other regions in the same frame. A reference list may be constructed for each direction in which prediction is done in accordance with a default standard. When the field referencing pattern uses a most recently coded reference field with the target field 102, the default list may include a reference field other than the most recently coded reference field in the first position. Reordering the reference field list to move the most recently coded reference field into the first position in the list may enable a greater number of B-skip, P-skip, B-direct, or P-direct macroblocks to occur. In the embodiment, the use of skip macroblocks or direct macroblocks may reduce a quantity of data processed during encoding of the target field 102 which may improve an encoding efficiency.

Figure 7A:
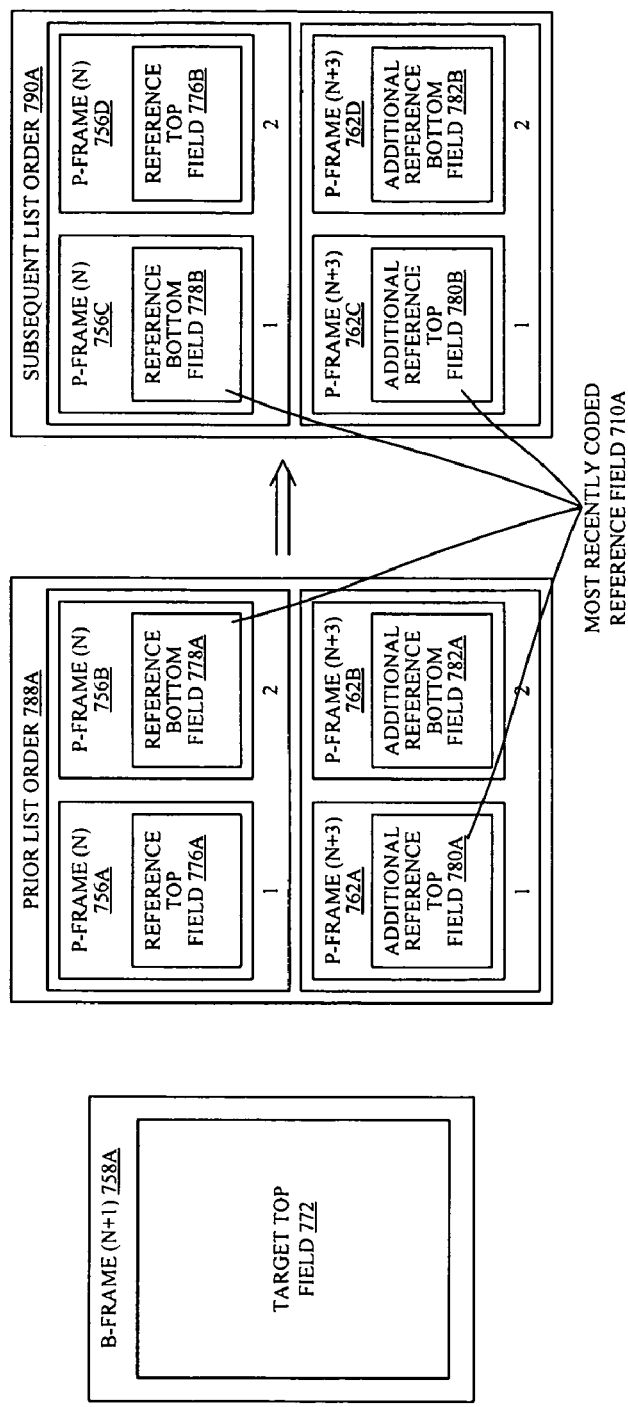
FIGS. 7A-7B are schematic views illustrating list reordering of a B-frame in an IBBP sequence, according to one embodiment.
Figure 7B:
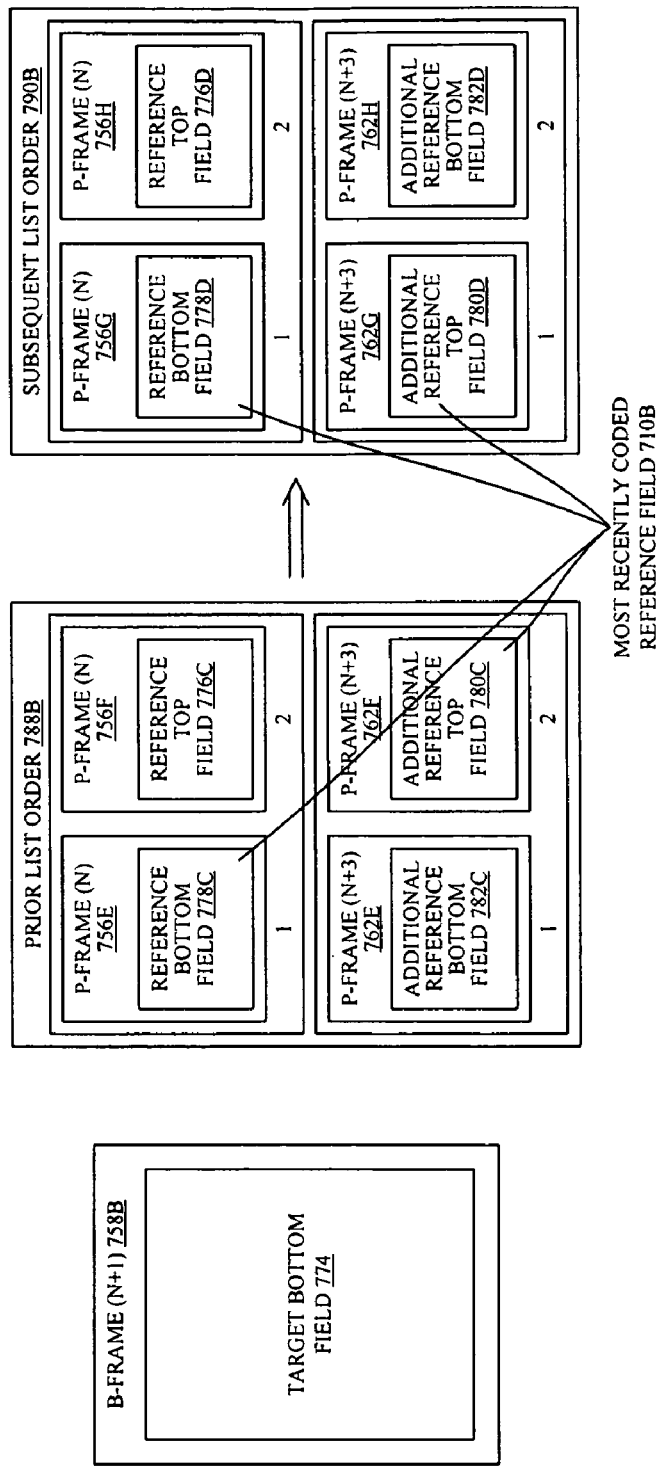

FIGS. 7A-7B are schematic views illustrating list reordering of a B-frame in an IBBP sequence, according to one embodiment. In particular, FIGS. 7A-7B illustrate a target top field 772, a target bottom field 774, a most recently coded reference field 710A-B, a prior list order 788A-B, a subsequent list order 790A-B, a P-frame (N) 756A-H, a P-frame (N+3) 762A-H, a reference top field 776A-D, a reference bottom field 778A-D, an additional reference top field 780A-D, and an additional reference bottom field 782A-D, according to one embodiment.

In a particular example embodiment, the list of the B-frame (N+1) 758A-B may include two elements. FIGS. 7A-B may exemplify list reordering of a B-frame in IBBP sequence. The prior list order 788B for the target top field 772 may include a P-frame (N) 756A-H, P-frame (N+3) 762A-H, a reference top field 776A-D, a reference bottom field 778A-D, an additional reference top field 780A-D, and an additional reference bottom field 782A-D, according to various embodiments.

After reordering, the subsequent list order 790A of the target top field 772 may include the most recently coded reference field 710A in the first position of the list with respect to both the P-frame (N) 756C and the P-frame (N+3) 762C. The most recently coded reference field 710A may include the reference bottom field 778A-B of the P-frame (N) 756B and 756C. The most recently coded reference field 710A may include the additional reference top field 780A and 780B of the P-frame (N+3) 762A and 762C. The subsequent list order 790B of the target bottom field 774 may include the most recently coded reference field 710B in the first position of the list with respect to both the P-frame (N) 756C and P-frame (N+3) 762C.

Figure 8:
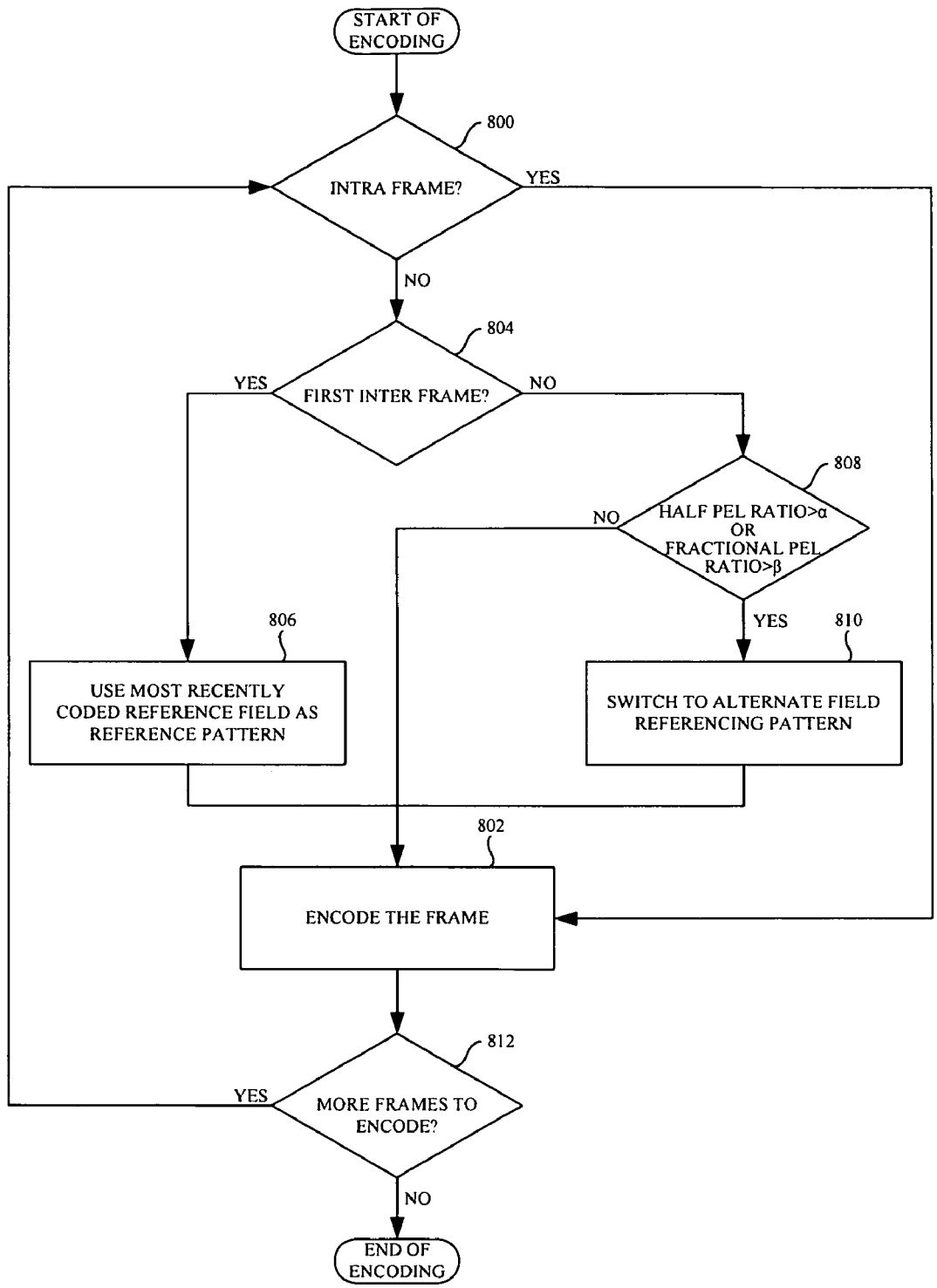
FIG. 8 is a flow chart that depicts switching the reference field pattern, according to one embodiment.

FIG. 8 is a flow chart that depicts switching the reference field pattern, according to one embodiment. In operation 800, the target frame 100 may be evaluated to determine whether it is an intra frame. In operation 802, if the target frame 100 is an intra frame, the target frame 100 may be encoded. In operation 806, if the target frame 100 is not an intraframe, the target frame 100 may be evaluated to determine if it is the first inter frame. In operation 802, if the target frame 100 is the first interframe, the most recently coded reference field pattern 124 may be selected to encode the target frame 100 in operation 802.

In operation 808, if the target frame 100 is not the first interframe, a half pel ratio or a fractional pel ratio may be used to determine whether the field referencing pattern is kept the same or changed when the target frame 100 is encoded. The field referencing pattern may be a same parity field pattern in which the reference field used has the same parity as the target field 100 to be encoded. For example, as shown in FIG. 3B, a target top field 372B encoded using the same parity field pattern may use one or both of the reference top field 376B and the additional reference top field 380B as a reference field. In addition, the target bottom field 374B may use one or both of the reference bottom field 378B and the additional reference bottom field 382B to perform motion estimation and encoding.

The field referencing pattern may be the most recently coded reference field. For example, as shown in FIG. 4B, the target field 402B of the P-frame (N+1) 454B may use the most recently coded reference field 410B of the P-frame (N) 452B to perform motion estimation and encoding of the target field 402B.

In an embodiment, the half-pel ratio may be proportional to a number of half pel macroblocks divided by a total number of macroblocks of the previously coded frame. In operation 810, if either the half pel ratio exceeds a threshold α or a fractional pel ratio is greater than a threshold β, then the field referencing pattern is switched to an alternate field referencing pattern, according to an embodiment. If the half pel ratio does not exceed the threshold α and the fractional pel ratio does not exceed the threshold β, then the frame may be encoded in operation 802 without changing the field referencing pattern.

The fractional pel ratio may be proportional to a number of fractional pel macroblocks divided by a total number of macroblocks of the previously coded frame. The threshold tolerance value α of the half pel ratio may be 0.5 and the threshold tolerance value β of the fractional pel ratio may be 0.9.

In an embodiment, a texture level of the currently coded frame may be determined using a group of pixels, and the thresholds α or β may be adapted to alternate thresholds α' or β'. The alternate threshold α' may be 0.3, and the alternate threshold β' may be 0.7. The determination of whether to maintain or to change the field referencing pattern may be determined using the threshold or alternate threshold numbers within a tolerance range determined by hardware or software performance characteristics.

The target frame 100 may subsequently be encoded in the operation 802. In operation 812, it may be determined whether there any other frames to be encoded. If other frames are to be encoded, one or more of the operations from 800-812 may be performed with respect to the other frames.

Figure 9:
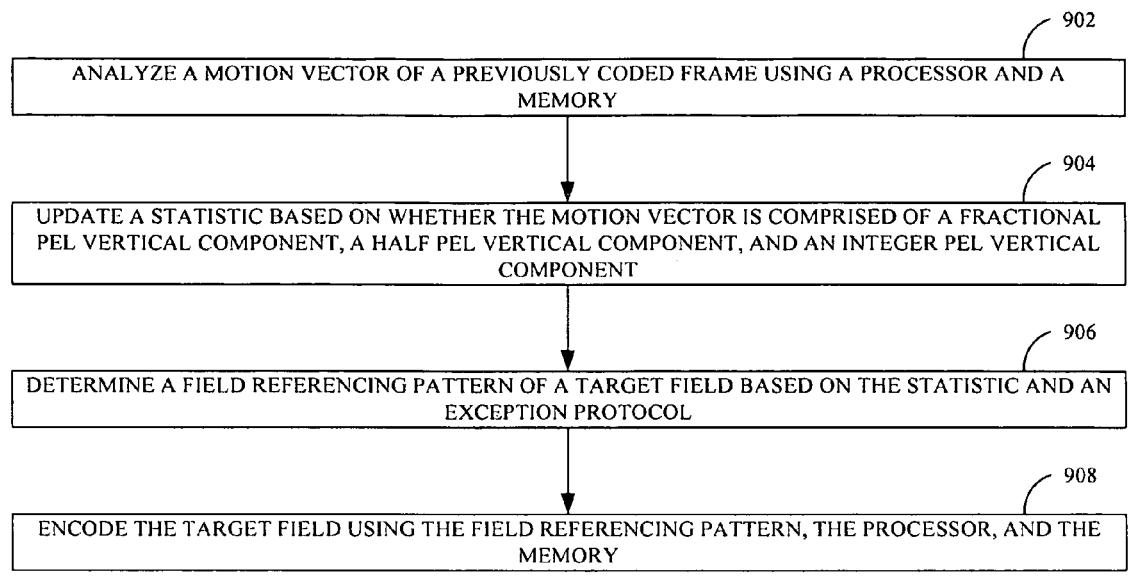
FIG. 9 is a process flow that illustrates encoding a target field using a reference field pattern, according to one embodiment.

FIG. 9 is a process flow that illustrates encoding a target field using a reference field pattern, according to one embodiment. In operation 902, a motion vector of a previously coded frame may be analyzed using a processor and a memory. For example the aggregation module 112 may analyze a motion vector of the previously coded frame 106 using the processor 114 and the memory 116.

In operation 904, a statistic may be updated based on whether the motion vector includes a fractional pel vertical component, a half pel vertical component, and an integer pel vertical component. For example, the evaluation module 118 may update a statistic based on whether the motion vector includes a fractional pel vertical component, a half pel vertical component, and an integer pel vertical component. The statistic may include a half pel ratio and a fractional pel ratio.

In operation 906, a field referencing pattern of a target field may be determined based on the statistic, an exception protocol, or both. For example, a selection module 120 may determine a field referencing pattern of the target field 102 based on the statistic and an exception protocol. The field referencing pattern may be the same parity field pattern 122 or the most recently coded reference field pattern 124. The statistic may be included in the statistical data 136 obtained from the evaluation module 118. In operation 908, the target field 102 may be encoded using the field referencing pattern, the processor 114, and the memory 116. The target field 102 may be encoded using the compression module 128.

Figure 10:
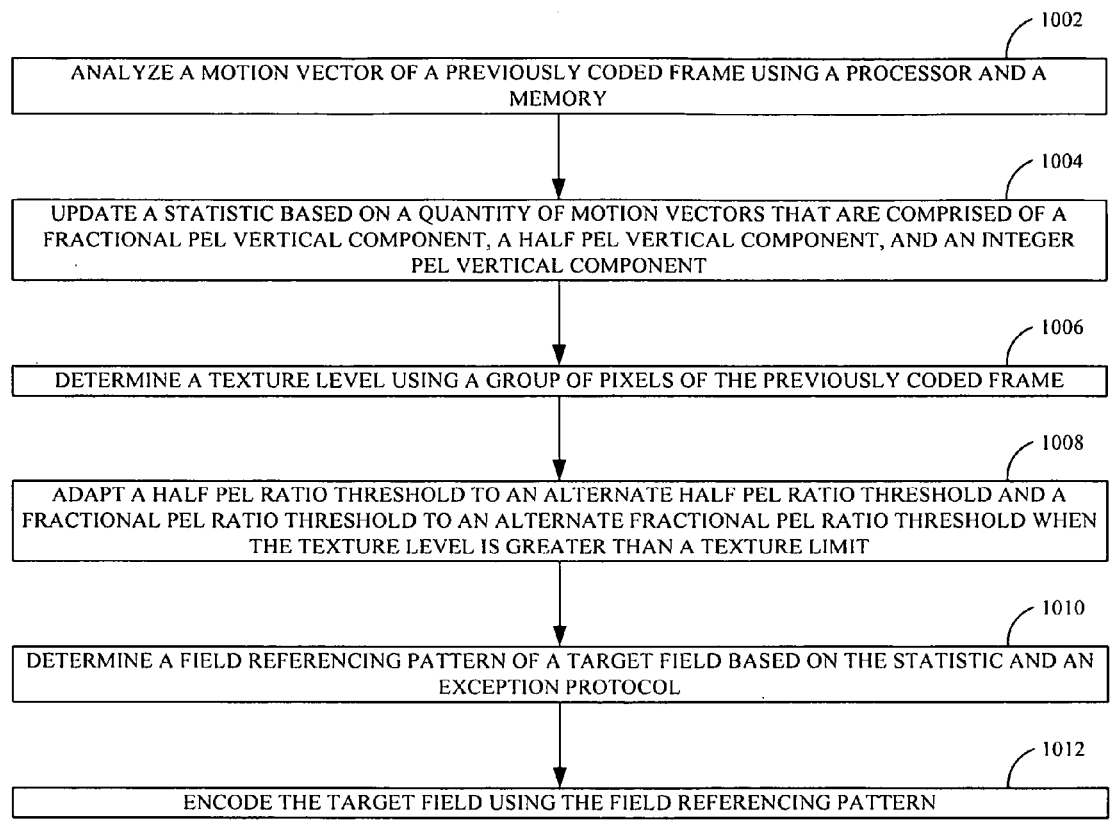
FIG. 10 is a process flow that illustrates encoding a frame based on a texture level of the frame, according to one embodiment.

FIG. 10 is a process flow that illustrates encoding a frame based on a texture level of the frame, according to one embodiment. In operation 1002, a motion vector of a previously coded frame may be analyzed using a processor and a memory. For example the aggregation module 112 may analyze a motion vector of the previously coded frame 106 using the processor 114 and the memory 116.

In operation 1004, a statistic may be updated based on a quantity of motion vectors that may include a fractional pel vertical component, a half pel vertical component, and an integer pel vertical component. For example, the evaluation module 118 may update a statistic. The statistic may include a half pel ratio and a fractional pel ratio. The half pel ratio may be proportional to a number of half pel macroblocks divided by a total number of macroblocks of the previously coded frame and the fractional pel ratio may be proportional to a number of fractional pel macroblocks divided by a total number of macroblocks of the previously coded frame.

In operation 1006, a texture level may be determined using a group of pixels of the currently coded frame. In operation 1008, a half pel ratio threshold may be adapted to an alternate half pel ratio threshold and a fractional pel ratio threshold to an alternate fractional pel ratio threshold when the texture level is greater than a texture limit. The alternate half pel ratio threshold may be within a threshold tolerance of 0.3 and the alternate fractional pel ratio threshold may be within a threshold tolerance of 0.7.

In operation 1010, a field referencing pattern of the target field 102 may be determined based on the statistic and an exception protocol. The field referencing pattern may be maintained, switched, or chosen based on the statistic. The field referencing pattern may be one the same parity field pattern 122 and the most recently coded reference field pattern 124. In operation 1012, the target field 102 may be encoded using the field referencing pattern. For example, the compression module 128 may encode the target field 102 using the field referencing pattern, the processor 114, and the memory 116.

Figure 11:
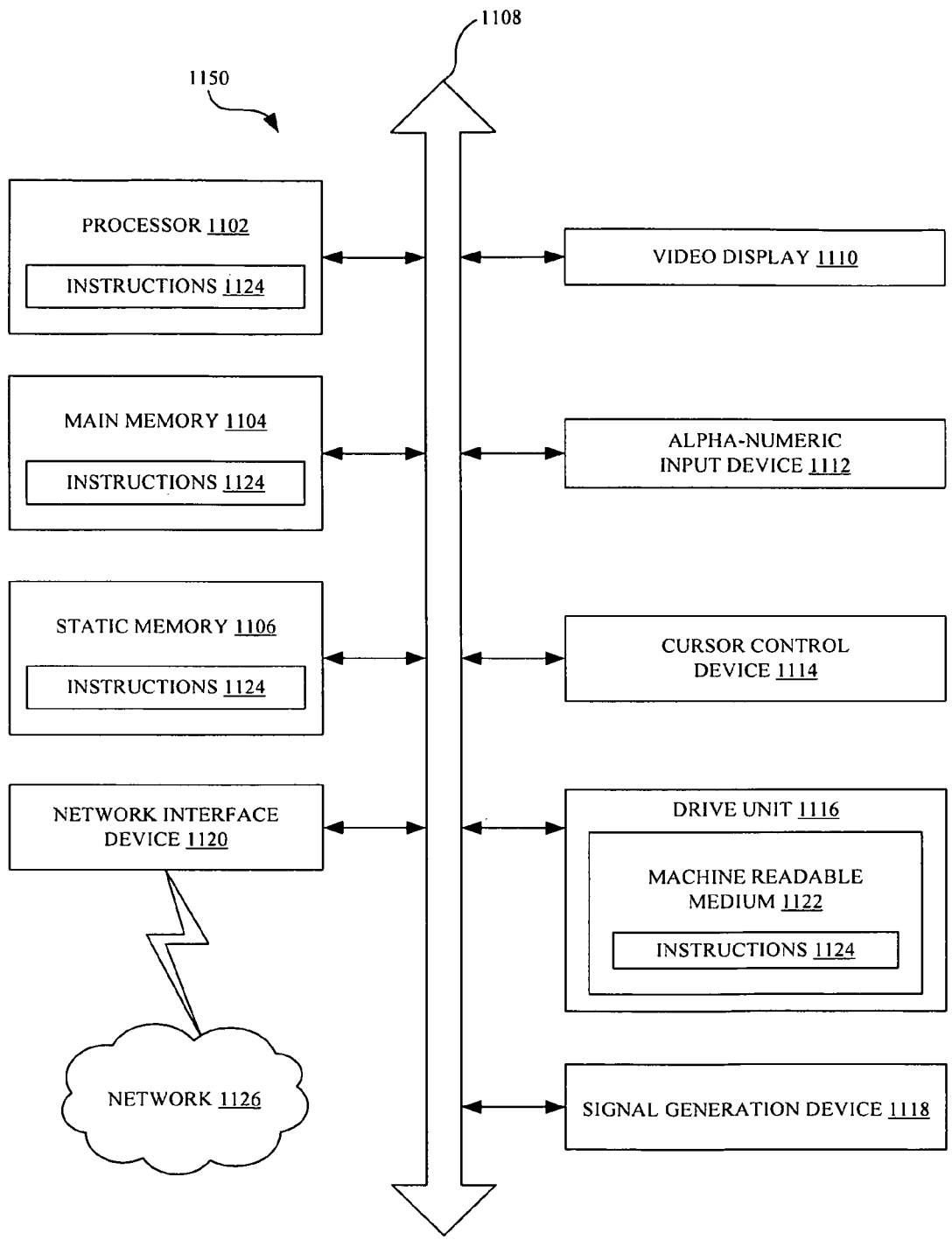
FIG. 11 is a diagrammatic system view of a data processing system in which any of the embodiments disclosed herein may be performed, according to one embodiment.

FIG. 11 is a diagrammatic system view of a data processing system in which any of the embodiments disclosed herein may be performed, according to one embodiment. In particular, the diagrammatic system view 1150 of FIG. 11 illustrates a processor 1102, a main memory 1104, a static memory 1106, a bus 1108, a video display 1110, an alpha-numeric input device 1112, a cursor control device 1114, a drive unit 1113, a signal generation device 1118, a network interface device 1120, a machine readable medium 1122, instructions 1124, and a network 1126, according to one embodiment.

The diagrammatic system view 1150 may indicate a personal computer and/or the data processing system in which one or more operations disclosed herein are performed. The processor 1102 may be a microprocessor, a state machine, an application specific integrated circuit, a field programmable gate array, etc. (e.g., an Intel® Pentium® processor). The main memory 1104 may be a dynamic random access memory and/or a primary memory of a computer system.

The static memory 1106 may be a hard drive, a flash drive, and/or other memory information associated with the data processing system. The bus 1108 may be an interconnection between various circuits and/or structures of the data processing system. The video display 1110 may provide a graphical representation of information on the data processing system. The alpha-numeric input device 1112 may be a keypad, a keyboard and/or any other input device of text (e.g., a special device to aid the physically handicapped).

The cursor control device 1114 may be a pointing device such as a mouse. The drive unit 1116 may be the hard drive, a storage system, and/or other longer term storage subsystem. The signal generation device 1118 may be a bios and/or a functional operating system of the data processing system. The network interface device 1120 may be a device that performs interface functions such as code conversion, protocol conversion and/or buffering required for communication to and from the network 1126. The machine readable medium 1122 may provide instructions on which any of the methods disclosed herein may be performed. The instructions 1124 may provide source code and/or data code to the processor 1102 to enable any one or more operations disclosed herein.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software or any combination of hardware, firmware, or software (e.g., embodied in a machine readable medium). For example, the various electrical structure and methods may be embodied using transistors, logic gates, and electrical circuits (e.g., application specific integrated (ASIC) circuitry or in Digital Signal Processor (DSP) circuitry).

Particularly, the aggregation module 112, the evaluation module 118, the selection module 120, and the compression module 128 of FIG. 1 may be enabled using software and using transistors, logic gates, and electrical circuits (e.g., application specific integrated ASIC circuitry) such as an aggregation circuit, an evaluation circuit, a selection circuit, a compression circuit, and other circuits.

In addition, it will be appreciated that the various operations, processes, and methods disclosed herein may be embodied in a machine-readable medium or a machine accessible medium compatible with a data processing system (e.g., a computer system), and may be performed in any order (e.g., including using means for achieving the various operations). Accordingly, the Specification and Drawings are to be regarded in an illustrative rather than a restrictive sense.

What is claimed is:

1. A method, comprising:
    analyzing a motion vector of a previously coded frame using a processor and a memory;
    updating a statistic based on whether the motion vector is comprised of at least one of a fractional pel vertical component, a half pel vertical component, and an integer pel vertical component;
    determining a field referencing pattern of a target field based on at least one of the statistic and an exception protocol;
    determining a texture level using a group of pixels of the currently coded frame; and
    adapting at least one of a half pel ratio threshold to an alternate half pel ratio threshold and a fractional pel ratio threshold to an alternate fractional pel ratio threshold when the texture level is greater than a texture limit.

2. The method of claim 1, further comprising:
    encoding the target field using the field referencing pattern, the processor, and the memory.

3. The method of claim 2, wherein the field referencing pattern identifies a reference field comprised of at least one of a same parity field and a most recently coded reference field.

4. The method of claim 3, wherein the statistic is determined using at least one of a quantity of the fractional pel vertical component, a quantity of the half pel vertical component, and a quantity of the integer pel vertical component.

5. The method of claim 4, wherein the statistic is comprised of at least one of a half pel ratio and a fractional pel ratio, wherein the half pel ratio is proportional to a number of half pel macroblocks divided by a total number of macroblocks of the previously coded frame and the fractional pel ratio is proportional to a number of fractional pel macroblocks divided by a total number of macroblocks of the previously coded frame.

6. The method of claim 5, wherein the field referencing pattern is changed when at least one of a half pel ratio threshold and a fractional pel ratio threshold is exceeded.

7. The method of claim 6, wherein the half pel ratio threshold is within a threshold tolerance of 0.5 and the fractional pel ratio threshold is within a threshold tolerance of 0.9.

8. The method of claim 5, wherein the field referencing pattern is kept the same when the half pel ratio is lower than a half pel ratio threshold and the fractional pel ratio is lower than a fractional pel ratio threshold.

9. The method of claim 2, wherein the exception protocol determines that the field referencing pattern is a most recently coded reference field when the target field is a bottom field of an intra coded frame.

10. The method of claim 2, wherein the exception protocol determines that the field referencing pattern is a most recently coded reference field when the target field is a bottom field of a P-frame in a sequence comprised of one or more B frames.

11. The method of claim 1, wherein the alternate half pel ratio threshold is within a threshold tolerance of 0.3 and the alternate fractional pel ratio threshold is within a threshold tolerance of 0.7.

12. The method of claim 11, further comprising:
    causing a machine to perform the method of claim 11 by executing a set of instructions embodied by the method of claim 11 in a form of a machine readable medium.

13. The method of claim 1, further comprising reordering a reference field list when the field referencing pattern identifies a reference field comprised of a most recently coded reference field.

* * * * *